United States Patent
Yoo et al.

(10) Patent No.: US 9,914,422 B2
(45) Date of Patent: Mar. 13, 2018

(54) STRUCTURE FOR DEPLOYING SEAT SIDE AIRBAG

(71) Applicant: Hyundai Motor Company, Seoul (KR)

(72) Inventors: Jong-Moon Yoo, Gyeonggi-do (KR);
Seon-Chae Na, Gyeonggi-do (KR);
Jun-Yeol Heo, Gyeonggi-do (KR);
Tae-Hyung Kim, Gyeonggi-do (KR);
Chan-Ho Jung, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/265,410

(22) Filed: Sep. 14, 2016

(65) Prior Publication Data

US 2017/0305377 A1    Oct. 26, 2017

(30) Foreign Application Priority Data

Apr. 21, 2016 (KR) .................. 10-2016-0048665

(51) Int. Cl.
*B60R 21/207* (2006.01)
*B60R 21/16* (2006.01)

(52) U.S. Cl.
CPC ...... *B60R 21/207* (2013.01); *B60R 2021/161* (2013.01)

(58) Field of Classification Search
CPC .................. B60R 21/207; B60R 2021/161
See application file for complete search history.

(56) References Cited

U.S. PATENT DOCUMENTS

| 5,967,603 | A | * | 10/1999 | Genders | B60R 21/207 280/730.2 |
| 5,988,674 | A | * | 11/1999 | Kimura | B60R 21/207 280/728.3 |
| 6,457,741 | B2 | * | 10/2002 | Seki | B60R 21/207 280/730.2 |
| 6,578,911 | B2 | * | 6/2003 | Harada | B60N 2/5825 280/730.2 |

(Continued)

FOREIGN PATENT DOCUMENTS

| JP | 3045889 U | 2/1998 |
| JP | 2010-184668 A | 8/2010 |

(Continued)

*Primary Examiner* — Faye M Fleming
(74) *Attorney, Agent, or Firm* — Mintz Levin Cohn Ferris Glovsky and Popeo, P.C.; Peter F. Corless

(57) ABSTRACT

A structure for deploying a side airbag installed in a seat of a vehicle is provided. The structure includes an interior pad is disposed adjacent to a first side of a side airbag and an exterior portion surrounded by an interior covering. An exterior pad is disposed adjacent to a second side of the side airbag and has an exterior portion surrounded by an exterior covering. An interior reinforcing fabric penetrates a pad aperture portion formed between the interior pad and the exterior pad and surrounds a first side of the side airbag. An exterior reinforcing fabric is integrally coupled to the exterior covering and surrounds the exterior portion of the exterior pad. The interior reinforcing fabric is spaced apart from the interior covering and disposed in a path different from a path of the interior covering. The collision performance is easily adjusted and production costs and weights are reduced.

9 Claims, 4 Drawing Sheets

(56) References Cited

U.S. PATENT DOCUMENTS

| | | | |
|---|---|---|---|
| 7,004,496 B2 * | 2/2006 | Bossecker | B60R 21/207 280/730.2 |
| 7,331,601 B2 * | 2/2008 | Tracht | B60R 21/207 280/728.2 |
| 8,152,197 B2 * | 4/2012 | Taguchi | B60R 21/207 280/728.2 |
| 9,079,556 B2 * | 7/2015 | Tanabe | B60R 21/207 |
| 9,174,601 B2 | 11/2015 | Tracht | |
| 9,434,341 B2 * | 9/2016 | Kaneko | B60N 2/449 |
| 2010/0295282 A1 * | 11/2010 | Kim | B60N 2/58 280/730.2 |
| 2014/0312664 A1 * | 10/2014 | Tanabe | B60R 21/207 297/216.13 |

FOREIGN PATENT DOCUMENTS

| | | | | |
|---|---|---|---|---|
| JP | 2011-068199 A | | 4/2011 | |
| JP | 2013193564 A | * | 9/2013 | ........... B60R 21/207 |
| JP | 2015-051700 A | | 3/2015 | |
| JP | 2015-147431 A | | 8/2015 | |
| KR | 10-0794031 B1 | | 1/2008 | |

\* cited by examiner

STRUCTURE FOR DEPLOYING SEAT SIDE AIRBAG

CROSS-REFERENCE TO RELATED APPLICATIONS

This application claims priority under 35 U.S.C. § 119 to Korean Patent Application No. 10-2016-0048665, filed on Apr. 21, 2016, in the Korean Intellectual Property Office, the disclosure of which is incorporated herein by reference in its entirety.

BACKGROUND

1. Field of the Invention

The present invention relates to a structure for deploying a side airbag installed in a seat of a vehicle, and more particularly, to a structure for deploying seat side airbag, which improves broadside collision performance and prevents gas in the side airbag from being rapidly discharged, by setting a deployment path of the side airbag using an interior reinforcing fabric and an exterior reinforcing fabric.

2. Description of the Related Art

Generally, a vehicle is provided with safety devices to protect occupants during a collision or a rollover accident and a typical safety device is an airbag apparatus that directly protects an occupant seated in a driver seat or a front passenger seat within the vehicle. During a vehicle collision, the airbag apparatus inflates at a high speed as compressed gas is instantaneously injected into the airbag by external impact force and protects the occupant from colliding with an object. Recently, to comply with improved safety regulations the protection of occupants using side airbags for passenger protection during a broadside collision of a vehicle has been adapted along with front airbags for passenger protection during a frontal collision.

When the airbag apparatus is abnormally (e.g., not typically) deployed, an occupant may be injured due to impact caused by the airbag apparatus. Additionally, the airbag apparatus may be abnormally deployed toward a seat disposed within the internal passenger compartment. The airbag apparatus should be designed to be deployed at a sufficiently high speed to protect occupants and to reduce injuries to occupants due to the airbag inflating at a high speed.

FIG. 1 is an exemplary view of the related art illustrating a typical structure for deploying a seat side airbag in the related art. FIG. 2 is an exemplary embodiment of a cross-sectional view taken along line A-A' in FIG. 1. As illustrated, the structure for deploying a seat side airbag in the related art includes a pad 2 in which a side airbag 1 is installed and embedded, a covering 3 that surrounds the pad 2, a reinforcing fabric 4, such as oxford fabric, disposed within the interior of the pad 2 and integrally coupled to the covering 3 and a backing cloth 5 disposed on the exterior of the pad 2 and integrally coupled to the covering 3.

In particular, to enable the side airbag 1 to be deployed to a proper position by penetrating between the covering 3 and the pad 2, an interior guide 6 and an exterior guide 7 formed from hard material are installed within the interior and on the exterior of the side airbag, respectively, to prevent the side airbag from being abnormally deployed into a seat within the passenger compartment or prevent a delay of deployment caused by an elongation percentage of the covering.

However, when an interval between the interior guide 6 made of an injection-molded material and a passenger is insufficient the structure for deploying the seat side airbag in the related art, during a broadside collision test for a vehicle increases the severity of injury to a passenger and as a result, an improvement of collision performance is difficult.

In the structure for deploying the seat side airbag in the related art, a bottom out phenomenon occurs when the side airbag is deployed. For example, the side airbag is compressed by the interior guide 6 and the exterior guide 7 and gas in the side airbag is rapidly discharged. The passenger comes into contact with hard components such as a door trim and as a result an improvement of collision performance is difficult. Accordingly, production costs and weights are increased due to the application of the interior guide 6 and the exterior guide 7 and profitability and fuel economy of a vehicle are adversely affected.

The above information disclosed in this section is merely for enhancement of understanding of the background of the invention, and therefore it should not be understood that the above information is regarded as being the prior art that has been already known to those skilled in the art.

SUMMARY

The present invention provides a structure for deploying a seat side airbag capable of reducing a likelihood of chest injuries when a collision occurs and provides improved adjustment of collision performance by omitting an interior guide and an exterior guide in the related art. The present provides a structure that deploys a seat side airbag that may couple an interior reinforcing fabric and an exterior reinforcing fabric to a seat frame by a single fixing device, to improve the assembly process and reduce production costs and weight.

An exemplary embodiment of the present invention provides a structure for deploying a seat side airbag, the structure may include an interior pad disposed adjacent to a first side of a side airbag and has an exterior portion surrounded by an interior covering, an exterior pad disposed adjacent to a second side of the side airbag and has an exterior portion surrounded by an exterior covering, an interior reinforcing fabric which penetrates a pad through portion formed between the interior pad and the exterior pad and surrounds a portion of the side airbag and an exterior reinforcing fabric which is integrally coupled to the exterior covering and surrounds the exterior portion of the exterior pad, in which the interior reinforcing fabric may be spaced apart from the interior covering and disposed in a path different from a path of the interior covering.

In the structure for deploying the seat side airbag according to the exemplary embodiment of the present invention, a first end of the exterior reinforcing fabric may be coupled to the exterior covering, and a second end of the exterior reinforcing fabric, together with the exterior covering, may be coupled to a fixing device coupled to a seatback frame. In some exemplary embodiments, the fixing device may be a W-shaped hook, the exterior reinforcing fabric may be coupled to a first end of the W-shaped hook, and one side of a second end of the W-shaped hook may be coupled by being caught by the seatback frame.

In additional exemplary embodiments, a first end of the exterior reinforcing fabric may be coupled to a first end of the exterior covering by sewing, and the second end of the exterior reinforcing fabric may be coupled to the second end of the fixing device by sewing or any other fastening mechanism. Moreover, in some exemplary embodiments, a first end of the interior reinforcing fabric may be coupled to a first end of the interior covering, and a second end of the interior reinforcing fabric may be coupled to the fixing device.

The exterior reinforcing fabric may be coupled to a first end of the fixing device, a first side of a second end of the fixing device may be coupled to the seatback frame, and a second side of a second end of the fixing device may be coupled to the interior reinforcing fabric. Additionally, in some exemplary embodiments of the present invention, the exterior reinforcing fabric and the interior reinforcing fabric may be coupled to the seatback frame by the single fixing device. The exterior reinforcing fabric and the interior reinforcing fabric may form a closed cross section. In further exemplary embodiments, a J-shaped hook may be coupled to a second end of the interior reinforcing fabric and the interior reinforcing fabric may be fixed as the fixing device is configured to capture the J-shaped hook.

A first end of the interior reinforcing fabric may be coupled to a first end of the interior covering by sewing and a second end of the interior reinforcing fabric may be coupled to the J-shaped hook by sewing. In the exemplary embodiments, ends of the interior covering and the exterior covering may be disposed adjacent to each other based on the pad aperture portion and the ends of the interior covering and the exterior covering, may be disposed adjacent to each other may be coupled to each other by sewing.

According to the present invention having the aforementioned configuration, the interior guide and the exterior guide in the related art may be omitted and substituted with the exterior reinforcing fabric and the interior reinforcing fabric that may be spaced apart from the interior covering and surrounds the side airbag. In particular, the interior reinforcing fabric formed from a flexible material may contact the chest of the passenger during a broadside collision of a vehicle, and collision performance may be adjusted.

According to the present invention, since the interior reinforcing fabric and the exterior reinforcing fabric do not sufficiently compress the side airbag, a bottom out phenomenon which compresses gas that may be rapidly discharged and as a result, the passenger may be prevented from coming into contact with a hard component such as a door trim. According to the present invention, since the interior deployment prevention structure and the exterior deployment prevention structure may be fastened simultaneously by the single fixing device improved assembly of the interior reinforcing fabric and the exterior reinforcing fabric may be achieved. According to the present invention, since the interior guide and the exterior guide in the related art may be omitted, production costs and overall weight may be reduced. Accordingly, the marketability of a vehicle and fuel economy of a vehicle may be improved.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
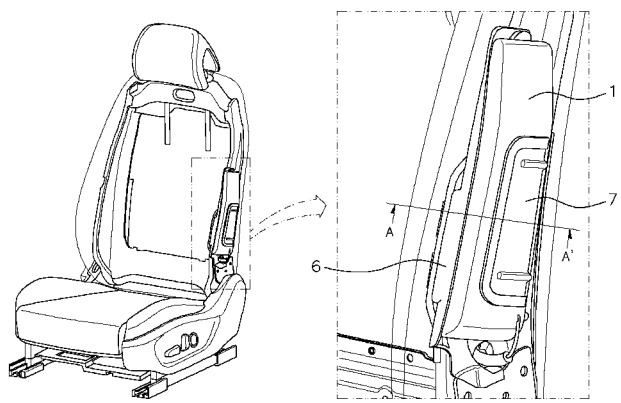
FIG. 1 is an exemplary view illustrating a typical structure for deploying a seat side airbag in the related art.

Hereinafter, the present invention will be described in detail with reference to the accompanying drawings so that those skilled in the technical field to which the present invention pertains may easily carry out the present invention. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

However, the present invention may be implemented in various different ways, and is not limited to the exemplary embodiment described herein. A part irrelevant to the description will be omitted to clearly describe the present invention, and the same or similar constituent elements will be designated by the same reference numerals throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 3:
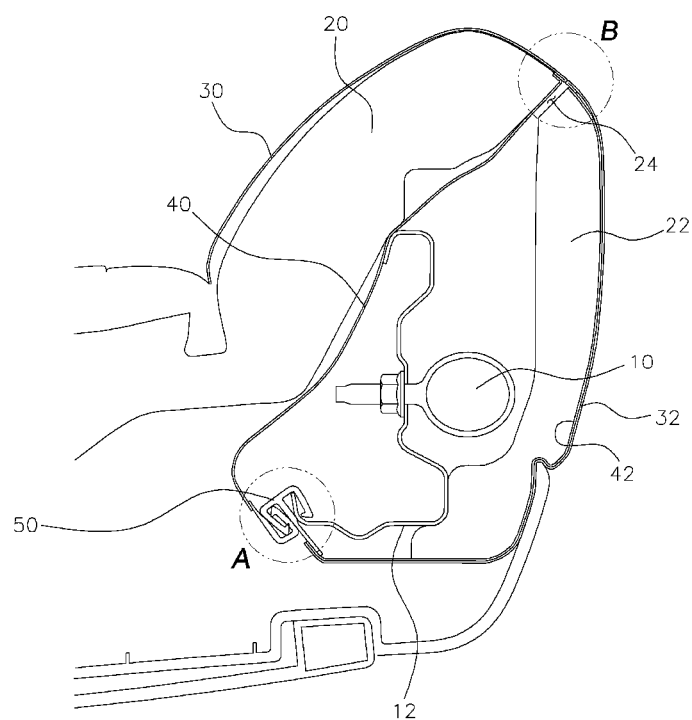
FIG. 3 is an exemplary cross-sectional view illustrating an appearance of a structure for deploying a seat side airbag according to an exemplary embodiment of the present invention.

FIG. 3 is an exemplary cross-sectional view illustrating an appearance of a structure for deploying a seat side airbag according to an exemplary embodiment of the present invention. As illustrated, the structure for deploying the seat side airbag according to the exemplary embodiment may include an interior pad 20 disposed adjacent to a first side (e.g., left side in the illustrated exemplary embodiment) of a side airbag 10 and has an exterior portion surrounded by an interior covering 30 and an exterior pad 22 disposed adjacent to a second side (e.g., right side in the illustrated exemplary embodiment) of the side airbag 10 and has an exterior portion surrounded by an exterior covering 32. The interior pad 20 and the exterior pad 22 may be spaced apart from each other at a predetermined distance. A pad aperture portion 24 may be formed between the interior pad 20 and the exterior pad 22. An interior reinforcing fabric 40 may be penetratively inserted into the pad aperture portion 24 to surround a first side of the side airbag 10.

Figure 2:
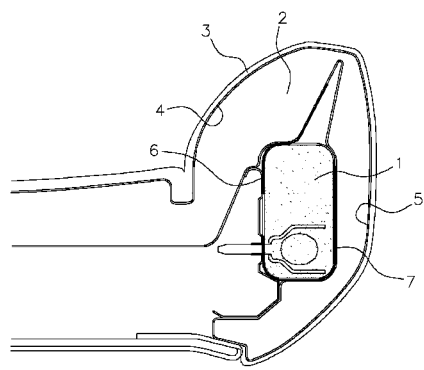
FIG. 2 is an exemplary cross-sectional view taken along line A-A' of FIG. 1 according to the related art.

In particular, unlike the related art illustrated in FIG. 2 that includes a reinforcing fabric 4, disposed within the interior of a pad 2 and is integrally coupled to a covering 3. The interior reinforcing fabric 40 according to the present invention may be spaced apart from the interior covering 30 and disposed in a path different from a path of the interior covering. An exterior reinforcing fabric 42 may be integrally coupled to the exterior covering 32 to surround the exterior portion of the exterior pad 22. In other words, the interior reinforcing fabric 40 according to the present invention may be disposed along a path different from a path of the interior covering 30. The exterior reinforcing fabric 42 and the exterior covering 32 may be disposed along the same path. Unlike the related art in which a backing cloth 5 coupled to the covering 3 merely protects an exterior portion of the pad and an exterior guide 7 made of a hard material is configured to deploy the side airbag, the exterior reinforcing fabric 42 according to the present invention may be configured to guide the side airbag 10.

The interior reinforcing fabric 40 and the exterior reinforcing fabric 42 may be formed of a material typical of an oxford fabric or the like having appropriate elasticity and appropriate tensile strength and may be formed from a flexible material unlike the interior guide 6 (e.g., as shown in FIG. 1) or the exterior guide 7 in the related art which serves to guide the side airbag. As described above, since the present invention may be configured to guide the side airbag using the interior reinforcing fabric 40 and the exterior reinforcing fabric 42 formed from a flexible material, the likelihood of injuries to a passenger during a broadside collision of a vehicle may be reduced. Accordingly, collision performance may be adjusted and may prevent a bottom out phenomenon when compressed gas is rapidly discharged.

Figure 4:
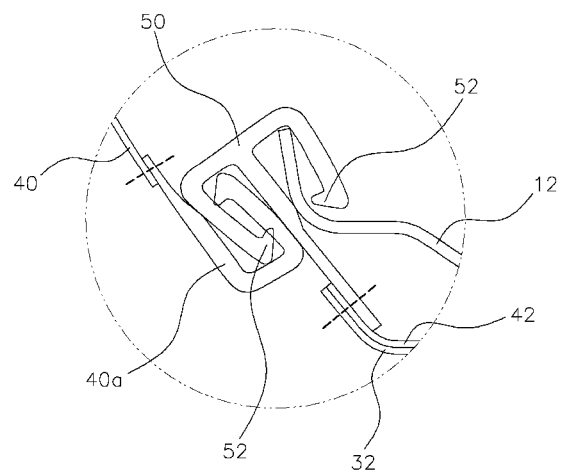
FIG. 4 is an exemplary enlarged view of part A in FIG. 3 according to an exemplary embodiment of the present invention.

FIG. 4 is an exemplary enlarged view of part A in FIG. 3. As illustrated, a first end (e.g., front end in the illustrated exemplary embodiment) of the exterior reinforcing fabric 42 may be coupled to a first end of the exterior covering 32. The second end (e.g., rear end in the illustrated exemplary embodiment) of the exterior reinforcing fabric 42 and the exterior covering 32 may be coupled to a fixing device 50 coupled to a seatback frame 12.

As indicated by dotted lines in FIGS. 3 and 4, the first end and the second end of the exterior reinforcing fabric 42 may be coupled to the first end of the exterior covering 32 and the first end of the fixing device 50, respectively, by sewing. As the fixing device 50, any device may be used as long as this fixing device may couple the interior reinforcing fabric 40 and the exterior reinforcing fabric 42 to the seatback frame 12 at the same time. Further as shown in the exemplary embodiment, the fixing device 50 may be a W-shaped hook. A first end (e.g., central portion) of the W-shaped hook may be elongated and coupled to the exterior reinforcing fabric 42. A catching portions 52 may be formed at the first side of the second end (e.g., right side) of the W-shaped hook and may be coupled to and configured to be captured by the seatback frame 12.

The first end (e.g., front end illustrated in the exemplary embodiment) of the interior reinforcing fabric 40 may be coupled to the first end of the interior covering 30. The second end (e.g., rear end in the illustrated exemplary embodiment) of the interior reinforcing fabric 40 may be coupled to the fixing device 50 coupled to the seatback frame 12. In other words, as described above, the exterior reinforcing fabric 42 may be coupled to the first end (e.g., central portion) of the fixing device 50. The first side of the second end (e.g., right side) of the fixing device 50 may be coupled to the seatback frame 12. The interior reinforcing fabric 40 may be coupled to the second side of the second end (e.g., left side) of the fixing device 50.

As described above, according to the present invention, the exterior reinforcing fabric 42 and the interior reinforcing fabric 40 may be coupled to the seatback frame 12 by the single fixing device 50. The exterior reinforcing fabric 42 and the interior reinforcing fabric 40 may form a closed cross section. Accordingly, an interior deployment prevention structure and an exterior deployment prevention structure may be fastened at the same time and the assembly of the interior reinforcing fabric and the exterior reinforcing fabric may be improved. Further, the side airbag may be prevented from being deployed at a portion other than a tear line 34 to be described below. In particular, a J-shaped hook 40a may be coupled to the second end of the interior reinforcing fabric 40. The J-shaped hook 40a may be captured by the catching portion 52 formed on the W-shaped hook (e.g., fixing device, 50) to fix the interior reinforcing fabric 40. As indicated by the dotted line in FIGS. 3 and 4, the first end of the interior reinforcing fabric 40 may be coupled to the first end of the interior covering 30 by sewing. The second end of the interior reinforcing fabric 40 may be coupled to the J-shaped hook 40a by sewing (e.g., detachable fastening technique).

Figure 5:
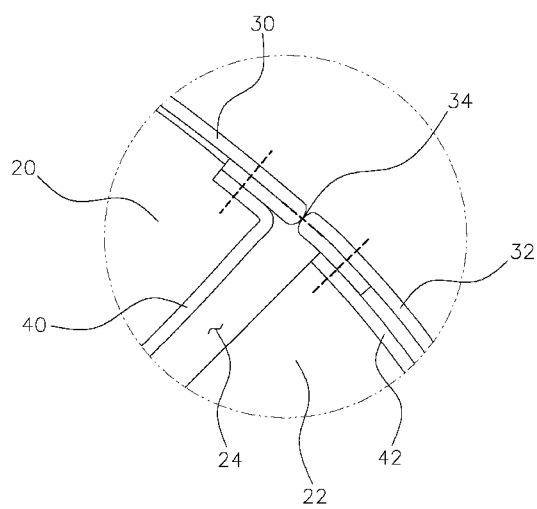
FIG. 5 is an exemplary enlarged view of part B in FIG. 3 according to an exemplary embodiment of the present invention.

FIG. 5 is an exemplary an enlarged view of part B in FIG. 3. As illustrated, the ends of the interior covering 30 and the exterior covering 32 may be disposed adjacent to each other based on the pad aperture portion 24. The ends of the interior covering 30 and the exterior covering 32 may be disposed each other and may be coupled to each other by sewing as indicated by a dotted line in FIG. 3. In other words, a sewing line between the interior covering 30 and the exterior covering 32 becomes the tear line 34. When the side airbag 10 is inflated during a vehicle collision, the tear line 34 may be torn to allow the side airbag to protrude at a proper position. In particular, the interior reinforcing fabric 40 and the exterior reinforcing fabric 42 may be configured to set a path of the side airbag.

According to the present invention having the aforementioned configuration, the interior guide 6 (e.g., as shown in FIGS. 1 and 2) and the exterior guide 7 in the related art are omitted and substituted with the exterior reinforcing fabric 42. The interior reinforcing fabric 40 may be spaced apart from the interior covering and surrounds the side airbag. For example, the interior reinforcing fabric 40 may be formed from a flexible material that contact the chest of the passenger during a broadside collision of a vehicle. Accordingly, and as a result, collision performance may be easily adjusted. Since the interior reinforcing fabric 40 and the exterior reinforcing fabric 42 do not sufficiently compress the side airbag, a bottom out phenomenon in which compressed gas is rapidly discharged may be prevented. Namely, the passenger may be prevented from coming into contact with a hard component (e.g., a door trim).

According to the present invention, since the interior deployment prevention structure and the exterior deployment prevention structure may be fastened at the same time by the single fixing device 50 the assembly of the interior reinforcing fabric and the exterior reinforcing fabric may be improved. The interior guide 6 and the exterior guide 7 in the related art may be omitted and production costs and weights may be reduced. In turn, the marketability of a vehicle and fuel economy of a vehicle may be improved.

The present invention, which has been described above, is not limited by the aforementioned exemplary embodiment and the accompanying drawings, and it is obvious to those skilled in the art to which the present invention pertains that various substitutions, modifications and alterations may be made without departing from the technical spirit of the present invention.

What is claimed is:

1. A structure for deploying a seat side airbag, comprising:
    an interior pad disposed adjacent to a first side of a side airbag and has an exterior portion surrounded by an interior covering;
    an exterior pad disposed adjacent to a second side of the side airbag and has an exterior portion surrounded by an exterior covering;
    an interior reinforcing fabric that penetrates a pad aperture portion formed between the interior pad and the exterior pad and surrounds the first side of the side airbag; and
    an exterior reinforcing fabric that is integrally coupled to the exterior covering and surrounds the exterior portion of the exterior pad,
    wherein a first end of the interior reinforcing fabric is coupled to a first end of the interior covering, and a second end of the interior reinforcing fabric is coupled to a fixing device.

2. The structure of claim 1, wherein a first end of the exterior reinforcing fabric is coupled to the exterior covering, and a second end of the exterior reinforcing fabric, together with the exterior covering, is coupled to the fixing device coupled to a seatback frame.

3. The structure of claim 2, wherein the fixing device is a W-shaped hook, the exterior reinforcing fabric is coupled to a first end of the W-shaped hook, and a first side of a second end of the W-shaped hook is configured to be coupled by being captured by the seatback frame.

4. The structure of claim 2, wherein the first end of the exterior reinforcing fabric is coupled to a first end of the exterior covering by sewing, and a second end of the exterior reinforcing fabric is coupled to a first end of the fixing device by sewing.

5. The structure of claim 1, wherein the exterior reinforcing fabric is coupled to a first end of the fixing device, a first side of a second end of the fixing device is coupled to the seatback frame, and a second side of a second end of the fixing device is coupled to the interior reinforcing fabric.

6. The structure of claim 1, wherein the exterior reinforcing fabric and the interior reinforcing fabric are coupled to the seatback frame by the single fixing device, and the exterior reinforcing fabric and the interior reinforcing fabric form a closed cross section.

7. The structure of claim 1, wherein a J-shaped hook is coupled to the second end of the interior reinforcing fabric, and the interior reinforcing fabric is fixed as the J-shaped hook is configured to be captured by the fixing device.

8. The structure of claim 7, wherein a first end of the interior reinforcing fabric is coupled to a first end of the interior covering by sewing, and a second end of the interior reinforcing fabric is coupled to the J-shaped hook by sewing.

9. The structure of claim 1, wherein ends of the interior covering and the exterior covering are disposed adjacent to each other based on the pad aperture portion, and the ends of the interior covering and the exterior covering, disposed adjacent to each other, are coupled to each other by sewing.

* * * * *